No. 812,846. PATENTED FEB. 20, 1906.
C. J. HEDEMANN.
LIQUID WEIGHING MACHINE.
APPLICATION FILED APR. 15, 1905.

3 SHEETS—SHEET 1.

WITNESSES:

INVENTOR
Christian J. Hedemann
BY
ATTORNEYS

No. 812,846. PATENTED FEB. 20, 1906.
C. J. HEDEMANN.
LIQUID WEIGHING MACHINE.
APPLICATION FILED APR. 15, 1905.

3 SHEETS—SHEET 2.

WITNESSES:

INVENTOR
Christian J. Hedemann
BY
ATTORNEYS

No. 812,846. PATENTED FEB. 20, 1906.
C. J. HEDEMANN.
LIQUID WEIGHING MACHINE.
APPLICATION FILED APR. 15, 1905.

3 SHEETS—SHEET 3.

WITNESSES:

INVENTOR
Christian J. Hedemann
BY
ATTORNEYS

UNITED STATES PATENT OFFICE.

CHRISTIAN J. HEDEMANN, OF HONOLULU, TERRITORY OF HAWAII.

LIQUID-WEIGHING MACHINE.

No. 812,846.　　　Specification of Letters Patent.　　　Patented Feb. 20, 1906.

Application filed April 15, 1905. Serial No. 255,794.

*To all whom it may concern:*

Be it known that I, CHRISTIAN J. HEDEMANN, a citizen of the United States, and a resident of Honolulu, Island of Oahu, Territory of Hawaii, have invented a new and Improved Liquid-Weighing Machine, of which the following is a full, clear, and exact description.

This invention relates to improvements in machines for weighing liquids, such as cane-juice or other material capable of running or discharging from a supply-pipe; and the object of the invention is to increase the accuracy of the weighing and efficiency of the machine.

It may be here stated that the present invention resides in means or additional features to the machine shown and described in my Patent No. 668,875, dated February 26, 1901.

I will describe a liquid-weighing machine embodying my invention and then point out the novel features in the appended claims.

Reference is to be had to the accompanying drawings, forming a part of this specification, in which similar characters of reference indicate corresponding parts in all the figures.

Figure 1:
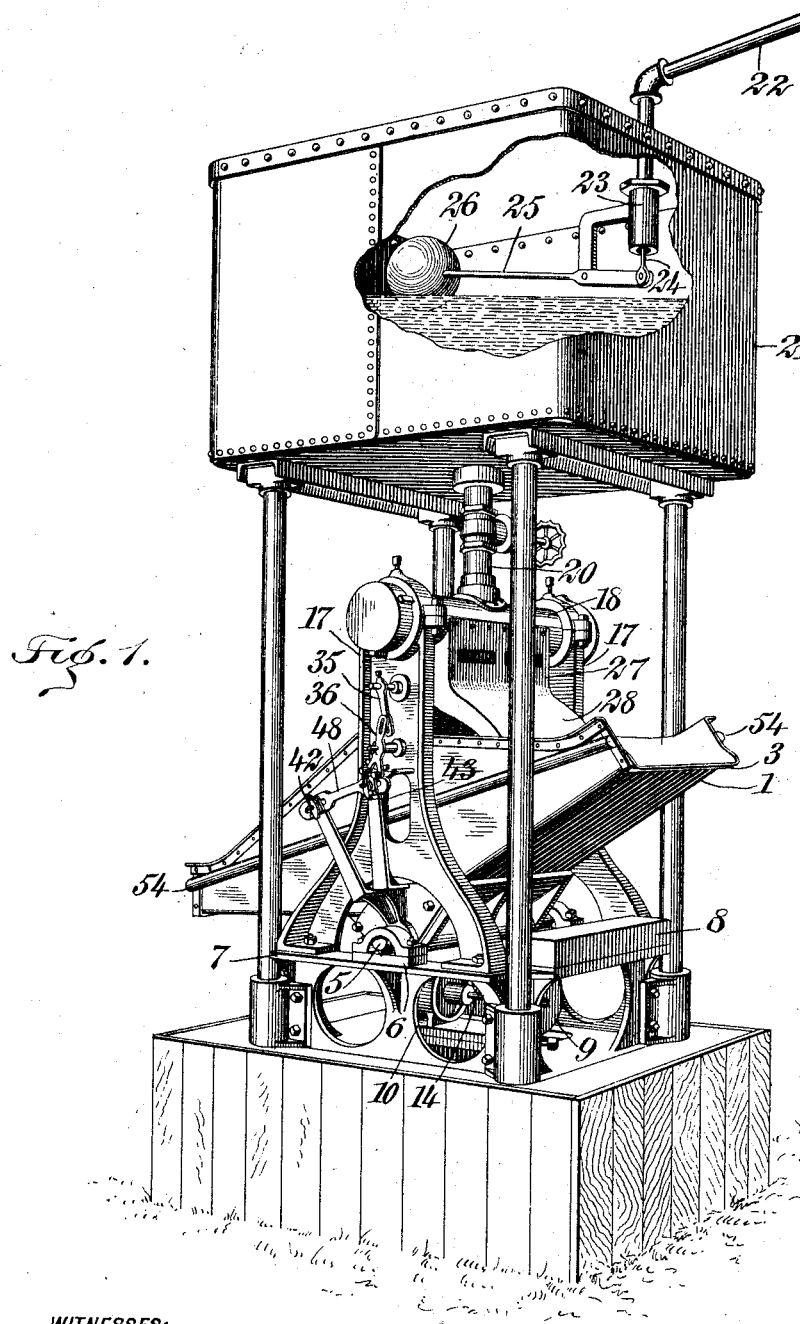
Figure 2:
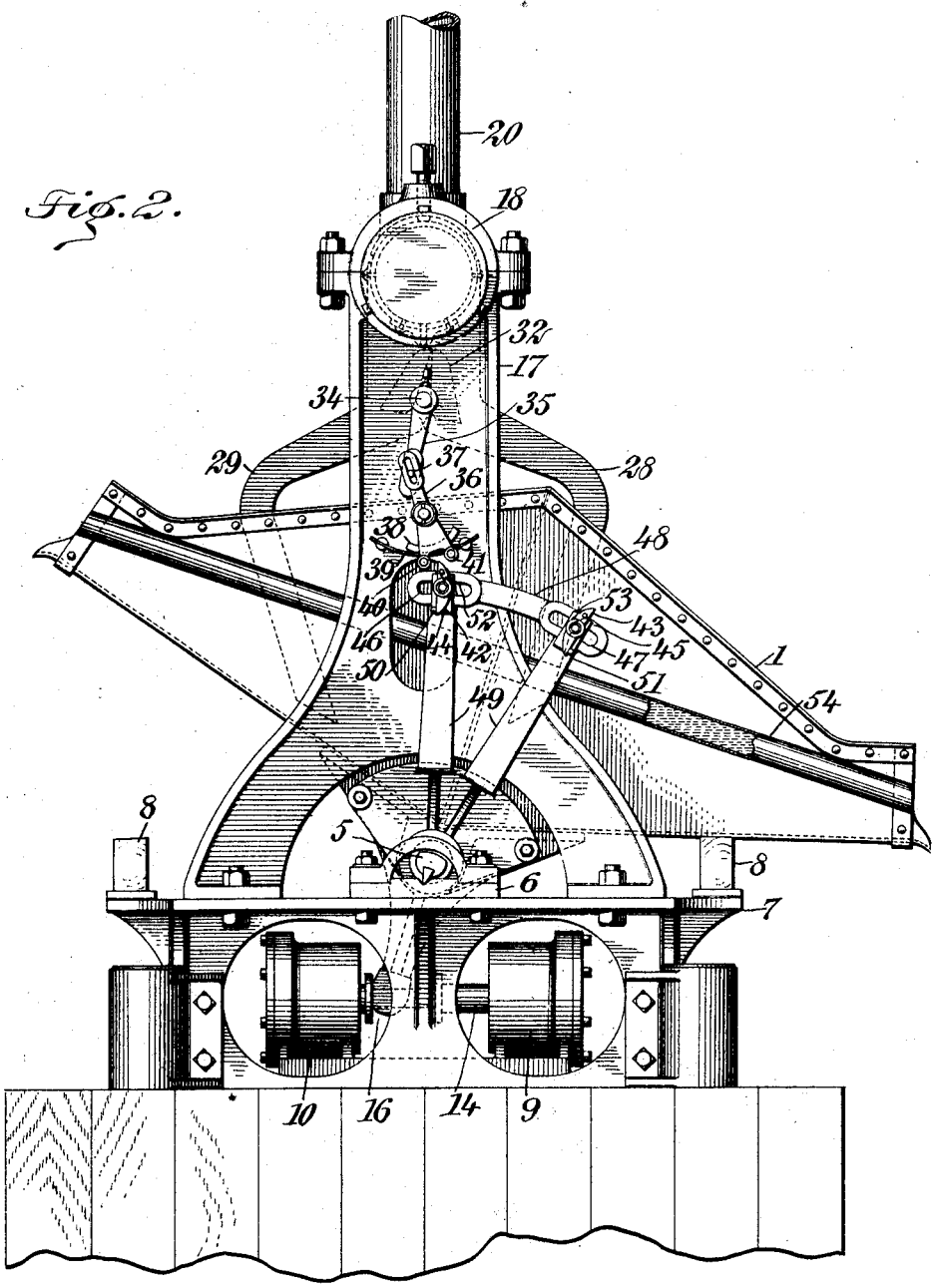
Figure 3:
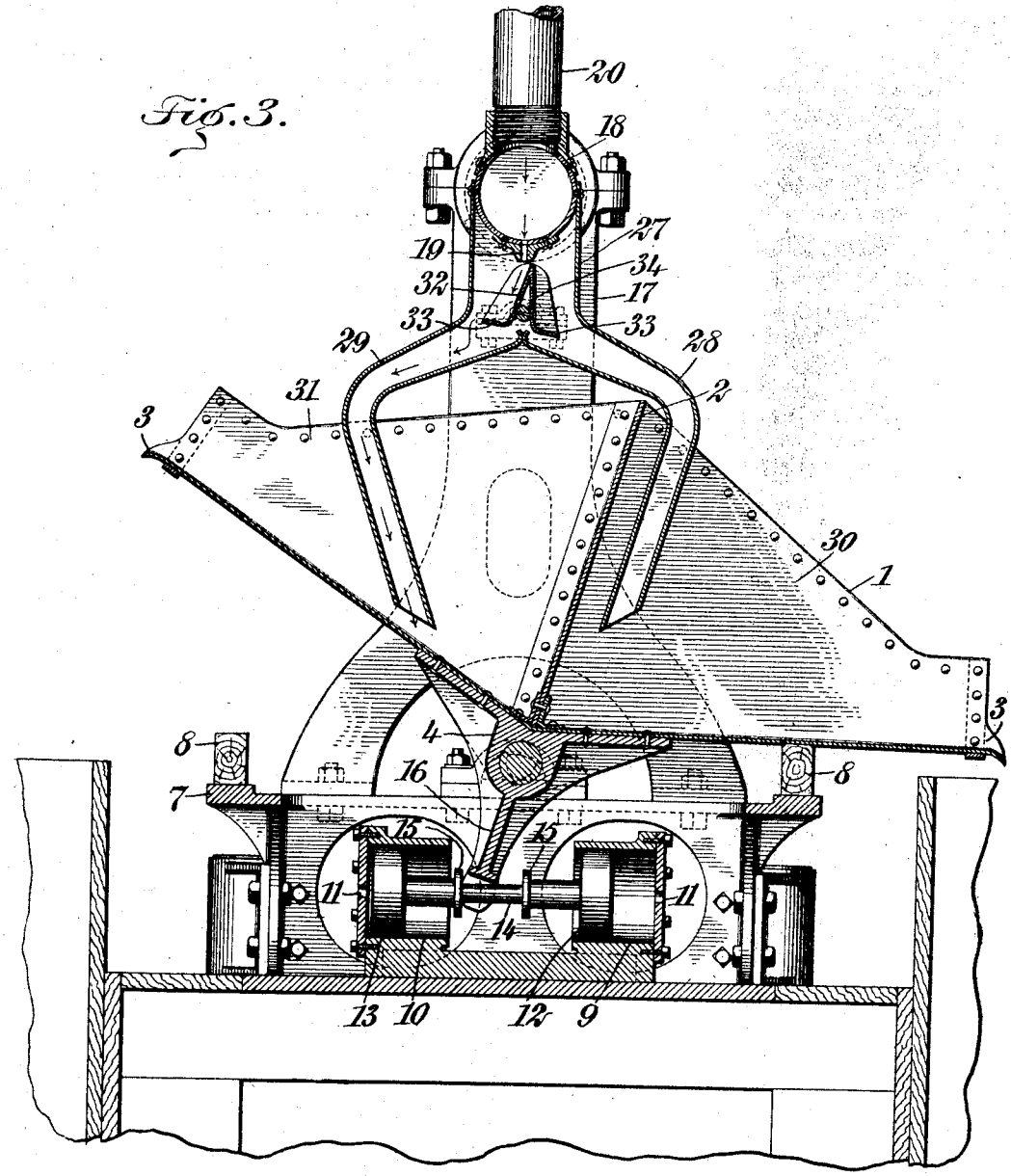

Figure 1 is a perspective view of a liquid-weighing machine embodying my invention. Fig. 2 is a side elevation thereof, and Fig. 3 is a sectional elevation.

Referring to the drawings, 1 designates a tray divided at its center by a vertical partition 2, thus providing two weighing-compartments, each compartment having an outlet 3 at its outer end. The tray is mounted on a casting 4, having trunnions 5, which are provided with knife-edges engaging in channels formed in bearing-plates 6, mounted on a base-frame 7. The tray is limited in its rocking movements in opposite directions by means of stop-bars 8, secured to the base-frame, and to prevent undue shock to the tray upon stopping I employ air-cylinders 9 10, having perforations 11 in their end walls, and operating in these cylinders are pistons 12 13, connected by a stem 14, on which are collars 15, and embracing the stem 14, between the collars 15, is the bifurcated end of an arm 16, extended downward from one of the trunnions 5.

Extended upward from the base-frame 7 are standards 17, and supported by these standards 17 is a supply-pipe 18, having a discharge-slot 19 at its lower side. The liquid to be weighed is fed to the supply-pipe 18 from a tube 20, leading from a tank 21, into which a pipe 22 leads from any suitable source of supply. A controlling-valve is arranged in a valve-casing 23 of the pipe 22, and this valve has a stem connection 24 with a lever 25, to which is attached a float 26. Connected to the supply-pipe 18 is a casing 27, from which pipes 28 29 lead, respectively, to compartments 30 31 of the tray 1.

Mounted to rock in the casing 27 is a V-shaped deflector 32, designed to direct the liquid into either one of the pipes 28 or 29, as will be hereinafter described. The lower end of the deflector has outwardly-extended flanges 33, and the said deflector is mounted on a rock-shaft 34, to an outwardly-extended end of which is secured an arm 35. A lever 36 is mounted to swing on one of the standards 17, and this lever is provided with a slot which receives a pin 37, extended from the arm 35. Attached to the lower portion of the lever 36 is an arc-shaped plate or shoe 38, which engages with a retarding-spring 39, and also mounted on the lower end of the lever 36 are rollers 40 41, designed to be engaged, respectively, by tappets 42 43, attached to blocks 44 45, adjustable in slots 46 47, formed in a plate 48, attached to arms 49, secured to one of the trunnions 5. The tappets 44 45 are held yieldingly against stop-lugs 50 51 by means of springs 52 53, and as these tappets are curved it is obvious that when the arms 49 are moved in one direction the tappet engaging with its roller 39 or 41 will be deflected so as to pass to the inner side thereof. On the reverse movement, however, the tappet that may be at the inner side or between the rollers 40 41 will engage with its roller upon the tilting of the tray, and thus reverse the deflector 32.

Arranged on opposite sides of the tray 1 and extended substantially the entire length thereof are tubes 54, which contain mercury or other suitable shifting weights, these weights being designed to practically counterbalance the weight of the liquid discharged in the compartments of the tray that may be receiving liquid In the operation a stream of liquid issuing from the slot 19 is caused by the deflector 32 to discharge through one of the pipes or tubes 28 or 29 into one of the compartments while the other compartment is resting on a stop-bar 8. As the compartment fills the center of gravity gradually shifts until the weight of the compartments and the liquid filled in it balances the weight of the empty compartment and the mercury on the side of the empty compartment. Then upon a very small addition of liquid in the compartment the tray is rocked from its position of rest with increasing rapidity to the position where the shifting outward of the center of gravity takes place, and the filled compartment discharges its contents into a tank or trough, which it is not deemed necessary to show here. Upon the rocking movement of the tray the deflector 32 is shifted, as before mentioned, so that the liquid from the pipe 18 will pass into the uppermost compartment of the tray.

Having thus described my invention, I claim as new and desire to secure by Letters Patent—

1. A weighing-machine comprising a tilting or rocking tray divided into two compartments, a feed-pipe over the tray, a casing attached to the feed-pipe, tubes leading from said casing to the compartments of the tray, and a rocking deflector arranged in the casing and operated by movements of the tray.

2. A weighing-machine comprising a tilting or rocking tray divided into two compartments, a feed-pipe over the tray, a casing attached to the feed-pipe, tubes leading from said casing to the compartments of the tray, a rocking deflector arranged in the casing and operated by movements of the tray, and a shifting weight supported on the tray.

3. A liquid-weighing machine comprising a tray divided into two compartments having outlets at their outer ends, trunnions on which said tray is mounted, a feed-pipe arranged above the tray, a casing attached to the feed-pipe, pipes leading from the casing to the compartments of the tray, a substantially V-shaped deflector arranged in the casing, a rock-shaft on which the deflector is mounted, an arm attached to one end of said rock-shaft, a lever having connection with said arm, a retarding-spring for the lever, rollers mounted on the lever, spring-pressed tappets carried by one of the trunnions and adapted for engagement with said rollers, and means for adjusting said tappets toward and from each other.

In testimony whereof I have signed my name to this specification in the presence of two subscribing witnesses.

CHRISTIAN J. HEDEMANN.

Witnesses:
WILLIAM W. KIRKLAND,
JOSEPH J. KENNEDY.